United States Patent
Zhang et al.

(10) Patent No.: US 10,693,754 B2
(45) Date of Patent: Jun. 23, 2020

(54) METHOD AND APPARATUS FOR DETERMINING RESOURCE INDICATOR

(71) Applicant: HUAWEI TECHNOLOGIES CO., LTD., Shenzhen, Guangdong (CN)

(72) Inventors: Shehui Zhang, Shenzhen (CN); Santosh Akhilesh, Bangalore (IN); Jian Wu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/110,244

(22) Filed: Aug. 23, 2018

(65) Prior Publication Data

US 2018/0367425 A1 Dec. 20, 2018

Related U.S. Application Data

(63) Continuation of application No. PCT/CN2017/074398, filed on Feb. 22, 2017.

(30) Foreign Application Priority Data

Feb. 24, 2016 (CN) .......................... 2016 1 0101425

(51) Int. Cl.
*H04L 12/26* (2006.01)
*H04L 29/08* (2006.01)
*H04W 4/70* (2018.01)

(52) U.S. Cl.
CPC .............. *H04L 43/08* (2013.01); *H04L 29/08* (2013.01); *H04L 43/06* (2013.01); *H04W 4/70* (2018.02); *H04L 67/02* (2013.01)

(58) Field of Classification Search
CPC .......... H04L 43/06; H04L 43/08; H04L 67/02
See application file for complete search history.

(56) References Cited

U.S. PATENT DOCUMENTS 6,061,724 A   5/2000  Ries et al.
6,333,936 B1 * 12/2001 Johansson ............... H04J 13/16
                                                     370/449

(Continued)

FOREIGN PATENT DOCUMENTS

CN   101179450 A   5/2008
CN   101640613 A   2/2010

(Continued)

*Primary Examiner* — Ayaz R Sheikh
*Assistant Examiner* — Debebe A Asefa
(74) *Attorney, Agent, or Firm* — Womble Bond Dickinson (US) LLP

(57) ABSTRACT

A method and an apparatus for determining a resource indicator are described, so that according to a specified resource, another resource associated with the resource can be determined, thereby rapidly determining an indicator of the resource. An association relationship tree information is obtained. The association relationship tree information is used to indicate association relationships between multiple resources. The multiple resources include resources located at at least three resource layers, the association relationships include a direct association relationship and an indirect association relationship. Two resources having the direct association relationship are separately located at two adjacent resource layers, and two resources having the indirect association relationship are separately located at resource layers spaced by at least one resource layer. A second resource having the indirect association relationship with a first resource is determined. The indicator of the first resource is determined according to the second resource.

20 Claims, 4 Drawing Sheets

(56) References Cited

U.S. PATENT DOCUMENTS

| | | | |
|---|---|---|---|
| 7,630,877 B2 * | 12/2009 | Brown | G06F 8/20 700/100 |
| 8,615,606 B2 | 12/2013 | Gentry et al. | |
| 2004/0243613 A1 | 12/2004 | Pourheidari | |
| 2012/0173693 A1 | 7/2012 | Zhang | |
| 2013/0017852 A1 | 1/2013 | Liu et al. | |
| 2015/0029854 A1 | 1/2015 | Starsinic et al. | |
| 2015/0199252 A1 | 7/2015 | Ilangovan et al. | |

FOREIGN PATENT DOCUMENTS

| | | |
|---|---|---|
| CN | 102567932 A | 7/2012 |
| CN | 102907167 B | 1/2013 |
| CN | 104794047 A | 7/2015 |
| EP | 0954788 B1 | 11/1999 |
| WO | 9833123 A1 | 7/1998 |

* cited by examiner

METHOD AND APPARATUS FOR DETERMINING RESOURCE INDICATOR

CROSS-REFERENCE TO RELATED APPLICATIONS

This application is a continuation of International Application No. PCT/CN2017/074398, filed on Feb. 22, 2017, which claims priority to Chinese Patent Application No. 201610101425.0, filed on Feb. 24, 2016. The disclosures of the aforementioned applications are hereby incorporated by reference in their entireties.

TECHNICAL FIELD

This application relates to the communications field, and more specifically, to a method and an apparatus for determining a resource indicator in the communications field.

BACKGROUND

With development of communications networks, to ensure network performance and service quality, network operators need to keep measuring the network performance and service quality of services carried by networks. Network services are hierarchical. An upper-layer service concept includes or depends on a lower-layer service concept. To calculate a network performance indicator, a massive quantity of bottom-layer inputs need to converge upwards layer by layer to eventually calculate a performance indicator of a top-layer resource. However, for a bottom-layer indicator, data of network elements needs to be calculated first, and a calculation result is output to a second layer from the bottom. After an indicator of the second layer from the bottom is calculated, a result of the indicator is then output to a third layer from the bottom. This process is repeated until an indicator of a top layer is obtained by means of calculation. Consequently, workload of intermediate layers is added, memory resources of the intermediate layers are consumed, and a speed of calculating a performance indicator is reduced to some extent.

Therefore, how to reduce workload of an intermediate layer and rapidly calculate a network performance indicator of a specified resource is an urgent technical problem to be resolved.

SUMMARY

A method and an apparatus for determining a resource indicator are described, so as to determine, according to a specified resource, another resource associated with the resource, thereby rapidly determining an indicator of the resource.

In at least one embodiment, a method for determining a resource indicator includes obtaining, by a server, association relationship tree information, where the association relationship tree information is used to indicate association relationships between multiple resources, the multiple resources include resources located at at least three resource layers, the association relationships include a direct association relationship and an indirect association relationship, two resources having the direct association relationship are separately located at two adjacent resource layers, and two resources having the indirect association relationship are separately located at resource layers spaced by at least one resource layer; determining, by the server according to the association relationship tree information, a second resource having the indirect association relationship with a first resource, where the second resource is used to determine an indicator of the first resource; and determining, by the server, the indicator of the first resource according to the second resource.

In at least one embodiment, a second resource associated with a first resource is determined according to association relationship tree information, and an indicator of the first resource is determined according to the second resource, thereby rapidly and accurately determining a network performance indicator of the first resource, reducing calculation workload of an intermediate-layer resource, and reducing a waste of space.

In at least one embodiment, the method includes obtaining, by the server, a preset association relationship tree model, where the association relationship tree model is used to indicate association relationships between resource types of the multiple resources; determining, by the server, the multiple resources corresponding to the resource types of the multiple resources; and determining the association relationship tree information according to the association relationship tree model and the multiple resources.

According to the preset association relationship tree model and according to different service scenarios and a current resource condition, the server may derive association relationship trees corresponding to service scenarios for the association relationship tree model. The association relationship tree may be a tree used to indicate association relationships between resources in a current service scenario, so that the server may determine the association relationship tree information according to the association relationship tree and further determine the second resource. In addition, because the association relationship tree may be determined according to different service scenarios, and for a same indicator, there may be different determining methods according to the different service scenarios, a network performance indicator of a resource can be accurately determined, where the network performance indicator reflects an actual condition of a current network.

In at least one embodiment, the method includes: determining, by the server according to the association relationship tree information, a third resource having the direct association relationship with the first resource, where the third resource is located at at least one resource layer between a resource layer at which the first resource is located and a resource layer at which the second resource is located; and determining, by the server, the second resource according to the third resource.

Further, the determining, by the server according to the association relationship tree information, a third resource having the direct association relationship with the first resource includes: determining, by the server, the third resource according to an identifier (ID) of the first resource and the association relationship tree information, where a property name indicated by a property of the third resource is the same as the ID of the first resource; or determining, by the server, a list of IDs of the third resource according to a property of the first resource, where the list of the IDs of the third resource is saved in the property of the first resource; and determining, by the server, the third resource according to the list of the IDs of the third resource and the association relationship tree information, where the third resource has a one-to-one correspondence with the ID of the third resource.

A process of determining the third resource by the server according to the association relationship tree information may be repeated until the server determines the second resource. Therefore, the server may find, by using the association relationship tree information, the second resource having the direct association relationship with the first resource, and use an indicator of the second resource as a target input value, where the target input value is used to determine an indicator of the first resource, thereby reducing calculation workload and development workload of an intermediate-layer resource, avoiding generation of an unnecessary intermediate indicator, saving a space resource, and improving calculation efficiency.

In at least one embodiment, the method includes: determining, by the server, the indicator of the first resource according to the second resource by using a target function, where the target function is saved in an Extensible Markup Language (XML) file.

The target function is invoked from the XML file, so that the indicator of the first resource may be determined according to the second resource by using the indicator of the second resource as an input value of the target function. The target function is saved in a form of the XML file, so that the function has extensibility and higher usability and is convenient and flexible.

Optionally, the target input value is a value or a value list. The value list is a list of second indicators of multiple second resources at a same time point, or a list of second indicators of one second resource at multiple time points.

A list function is extended to two types of functions: a multiple-input single-output function and a multiple-input multiple-output function, so that the calculation frame supports calculation of a horizontal dimension of a resource object and a vertical dimension of time. Further, the target function is classified into a first target function and a second target function, so that when the server runs, the server carries out execution according to a classification, thereby achieving flexibility and convenience and facilitating implementation.

In at least one embodiment, an apparatus for determining a resource indicator is configured to perform the methods described herein. In at least one embodiment, the apparatus includes modules configured to perform the methods described herein.

In at least one embodiment, a device for determining a resource indicator includes a receiver, a transmitter, a memory, a processor, and a bus system. The receiver, the transmitter, the memory, and the processor are connected by using the bus system. The memory is configured to store an instruction. The processor is configured to execute the instruction stored in the memory to control the receiver to receive a signal and control the transmitter to send a signal. When the processor executes the instruction stored in the memory, the execution enables the processor to perform the methods described herein.

In at least one embodiment, a computer readable medium, configured to store a computer program includes an instruction for performing the methods described herein.

In at least one embodiment, a method and an apparatus for determining a resource indicator, so that according to a specified resource, another resource associated with the resource can be determined, thereby rapidly determining an indicator of the resource, reducing calculation workload of an intermediate-layer resource, and reducing a waste of space.

DESCRIPTION OF EMBODIMENTS

Figure 1:
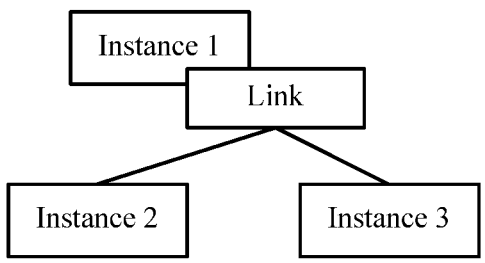
FIG. 1 is a schematic diagram of an association relationship tree of network resources according to an embodiment of the invention.
Figure 2:
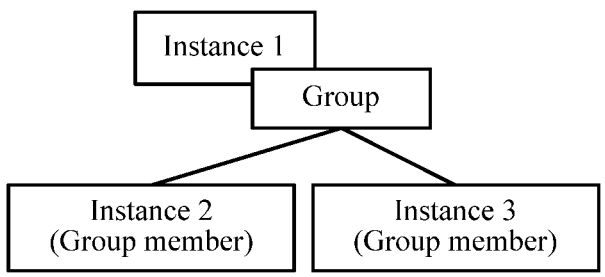
FIG. 2 is a schematic diagram of an association relationship tree of network resources according to an embodiment of the invention.
Figure 3:
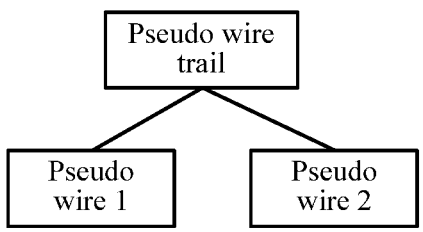
FIG. 3 is a schematic diagram of an association relationship tree of network resources according to an embodiment of the invention.
Figure 4:
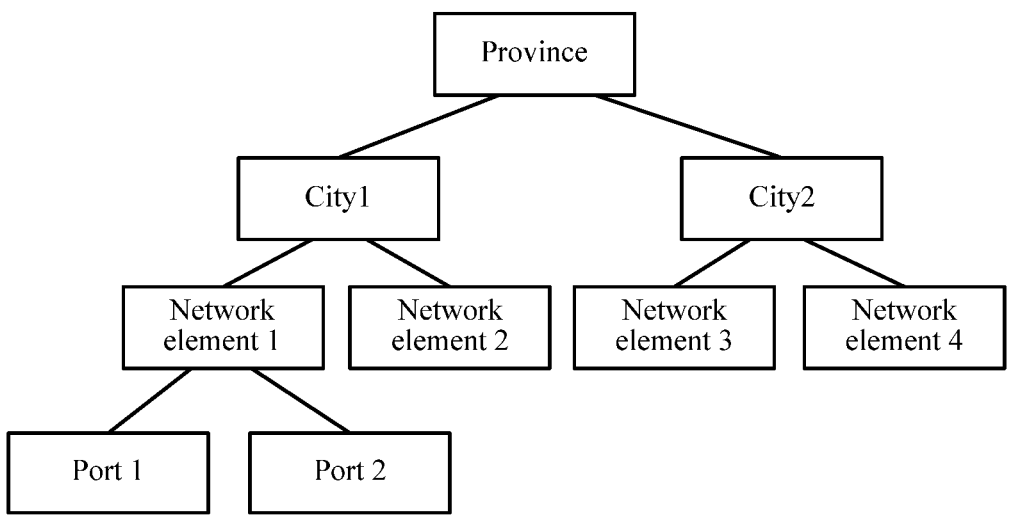
FIG. 4 is a schematic diagram of an association relationship tree of network resources according to an embodiment of the invention.

FIG. 1 to FIG. 4 are schematic diagrams of an association relationship tree of network resources according to an embodiment of the invention. It may be seen from FIG. 1 to FIG. 4 that an indicator of a resource (an instance for short, for ease of description) may directly or indirectly depend on an indicator of a lower-layer resource. In other words, an indicator of a resource may be directly or indirectly associated with an indicator of a lower-layer resource. The lower-layer resource may be two resources independent of each other. As shown in FIG. 1, an indicator of an instance 1 depends on indicators of an instance 2 and an instance 3 that are linked via a Link) to the instance 1. The instance 1 has common association relationships (or, reference relationships) with the instance 2 and the instance 3. The lower-layer resource may be a group of resources. As shown in FIG. 2, the indicator of the instance 1 depends on indicators of group (Group) members e.g., the instance 2 and the instance 3, of the instance 1. That is, the instance 2 and the instance 3 may be understood as group members of the instance 1, or the indicator of the instance 1 is associated with the indicators of the instance 2 and the instance 3. The instance may directly depend on indicators of lower-layer resources, that is, the instance has direct association relationships (or, direct reference relationships) with the indicators of the lower-layer resources. As shown in FIG. 3, an indicator of a pseudo wire (PW) trail directly depends on indicators of lower-layer resources PW1 and PW2 of the pseudo wire trail. The instance may indirectly depend on indicators of lower-layer resources of the instance, that is, the instance has indirect association relationships (or, indirect reference relationships) with the indicators of the lower-layer resources. As shown in FIG. 4, a network performance indicator of a province depends on network elements (NE) (including NE1, NE2, NE3, and NE4) in cities including e.g., a city 1 and a city 2 within the province, or further depends on ports (e.g., a port 1 and a port 2) of the NEs, that is, the province has indirect association relationships (or, indirect reference relationships or inter-layer reference relationships) with the NEs and the ports.

It may be seen from FIG. 1 to FIG. 4 that when an indicator (a first indicator for short, for ease of distinguishing and understanding) of a top-layer resource (a first resource for short, for ease of distinguishing and understanding) needs to be determined, the determining needs to depend on an indicator (a second indicator for short, for ease of distinguishing and understanding) of a lower-layer resource (a second resource for short, for ease of distinguishing and understanding) of the top-layer resource. Therefore, the second resource needs to output an indicator of the second resource to the first resource, so that the first resource determines the first indicator according to the second indicator.

Specifically, when the second resource and the first resource have an indirect association relationship, the second resource needs to output the second indicator to a resource (a third resource for short, for ease of distinguishing and understanding) located between the second resource and the first resource. The third resource obtains, by means of calculation according to an input second indicator, an indicator (a third indicator for short, for ease of distinguishing and understanding) corresponding to the third resource, and then inputs the third indicator to the first resource, so that the first resource determines the first indicator according to the third indicator.

It should be understood that in most service scenarios, the third resource is not a resource at only one layer, but instead, may be resources at multiple layers. The third indicator corresponding to the third resource is not only one output value, but instead, may be values output after multiple times of calculation. This greatly increases calculation workload and wastes resource space.

Further, in some service scenarios, a single function is insufficient to determine a performance indicator of a network. For example, it is assumed that indicator values of bandwidth utilization of a group of ports are generated every 15 minutes, and average bandwidth utilization of each port is calculated every day. However, a calculation range only focuses on top 30% data of each day. In this case, needed functions include a top N (TOPN) function and an average (AVG) function.

In the conventional techniques, a calculation process includes the following steps:

Step 1: Define an indicator A by using the TOPN function. The TOPN function uses all data collected at ports as input values, sorts the input values in descending order, counts rows, calculates a subscript of a row corresponding to 30%, returns a value in the row, and uses the value as the indicator A.

Step 2: Use the indicator A as an input value, sort again all the data collected at the ports in descending order, obtain values greater than the indicator A by means of filtering, and calculate an average value.

It can be seen from above that in the conventional techniques, when performing calculation by using a nested function, all functions in which a list is input and a value is output need to be performed two or more times, resulting in a large increase in workload. Besides, an intermediate indicator A is generated additionally. In some service scenarios, there may be multiple intermediate indicators A. As a result, a space resource is wasted.

Correspondingly, a method for determining a network performance indicator is provided, so that according to a specified resource, another resource on which the resource depends can be determined, thereby rapidly determining a network performance indicator of the resource.

Figure 5:
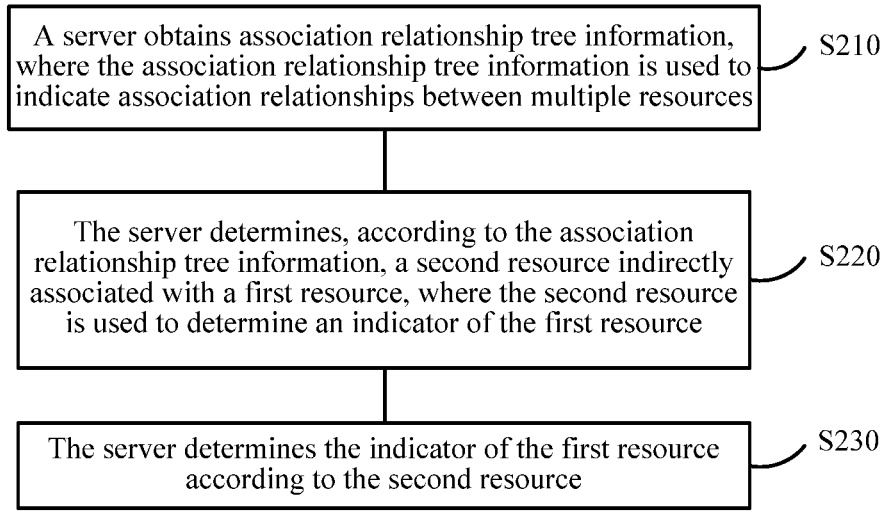
FIG. 5 is a schematic flowchart of a method for determining a resource indicator according to an embodiment of the invention.

FIG. 5 is a schematic flowchart of a method 200 for determining a network performance indicator according to an embodiment of the invention. As shown in FIG. 5, the method 200 includes the following operations.

S210: A server obtains association relationship tree information, where the association relationship tree information is used to indicate association relationships between multiple resources, the multiple resources include resources located at at least three resource layers, the association relationships include a direct association relationship and an indirect association relationship, two resources having the direct association relationship are separately located at two adjacent resource layers, and two resources having the indirect association relationship are separately located at resource layers spaced by at least one resource layer.

S220: The server determines, according to the association relationship tree information, a second resource having the indirect association relationship with a first resource, where the second resource is used to determine an indicator of the first resource.

S230: The server determines the indicator of the first resource according to the second resource.

Specifically, the server may represent, according to network service conditions of resources managed by the server, association relationships between the resources managed by the server in a form of an association relationship tree and save the association relationships. The association relationship tree may be used to indicate information of the association relationships between the resources. Therefore, the association relationship tree information may be determined according to the association relationship tree, so that the second resource associated with the first resource may be determined. For example, the schematic diagrams that are shown in FIG. 1 to FIG. 4 and that are of the association relationship tree of the network resources may be used as a form of expression of the association relationship tree information. It may be seen from the figures that the association relationship tree is used to indicate association relationships between multiple resources, and the multiple resources include resources located at at least three resource layers. According to the association relationships between the resources, the association relationships may include a self-association relationship, a direct association relationship, and an indirect association relationship. The self-association relationship may be understood as that a first indicator of the first resource is associated with another indicator of the first resource, and the first indicator may be determined according to the another indicator of the first resource. The direct association relationship may be understood as that a resource layer at which the first resource is located is associated with a resource (for example, the third resource) of a layer that is adjacent to the resource layer, a first indicator may be determined according to a third indicator of the third resource, and the first indicator is not associated with another resource. The indirect association relationship may be understood as that a resource layer at which the first resource is located is associated with a resource (for example, the second resource) of a layer that is not adjacent to the resource layer, and a first indicator may be determined according to a second indicator of the second resource.

That is, when the server needs to determine the indicator (e.g., the first indicator) of the first resource, the server may first obtain the association relationship tree information associated with the first resource, and determine the first indicator according to the second resource that is indicated by the association relationship tree information and that is associated with the first resource.

It should be understood that the association relationship tree is merely used as an example of the association relationship tree information for description, but should not constitute any limitation to embodiments of the invention, and embodiments of the invention are not limited thereto. Other methods and forms for representing the association relationships of the resources shall fall within the protection scope of embodiments of the invention.

In S210, the server may obtain, according to different service scenarios of the first resource, association relationship tree information corresponding to a service scenario, and may determine, in the association relationship tree information, a resource having a direct relationship or a resource having an indirect relationship with the first resource. For example, the association relationship tree information may be used to indicate the association relationships between resources at at least three resource layers. The first resource may be a resource located at a top resource layer in the association relationship tree information. The resource depends on the second resource at a bottom resource layer in the association relationship tree information. In other words, resource layers at which the first resource and the second resource are separately located are spaced by at least one resource layer, and a resource of the at least one resource layer may be the third resource.

In S220, the server may determine, according to the association relationship tree information, the third resource directly associated with the first resource and the second resource indirectly associated with the first resource. In other words, the server may determine, according to the association relationship tree information, on which indicator of which resource the first indicator depends.

In at least one embodiment, the first resource is indirectly associated with the second resource, that is, the first indicator depends on the second indicator of the second resource. That is, when the first indicator needs to be determined, the second indicator needs to be determined first. The second indicator may be collected by the server from the second resource, or may be obtained in a manner of reporting by the second resource.

It should be noted that there may be one second resource, or there may be more than one second resource. Each second resource corresponds to one second indicator, and determining of the first indicator depends on each second indicator. A quantity of second resources is not specifically limited in embodiments of the invention.

It should be further noted that there may be one third resource, or there may be more than one third resource. There may be one resource layer at which the third resource is located, or there may be multiple adjacent resource layers at which the more than one third resource is located. The one or more resource layers are located between the resource layer at which the first resource is located and the resource layer at which the second resource is located. In the resource layer at which the third resource is located, a top resource layer may be adjacent to the resource layer at which the first resource is located, and a bottom resource layer may be adjacent to the resource layer at which the second resource is located. Therefore, the second indicator may be reported by the third resource to the first resource. A quantity of third resources and a quantity of resource layers at which the third resources are located are not specifically limited in embodiments of the invention.

In S230, the server may determine the second indicator according to the second resource, and may obtain a needed first indicator by means of calculation by using different functions according to different indicator types that are needed. For example, if a total transmission bandwidth (that is, an instance of the first indicator) of a province needs to be calculated, transmission bandwidths (that is, an instance of the second indicator) of ports of network elements of cities, districts, and counties on which the province depends may be used as a reference. The transmission bandwidths of the ports corresponding to the network elements are obtained from the network elements, and the total transmission bandwidth of the province may be determined by using a summation function.

It should be understood that the function listed herein is merely used as an example for description, but should not constitute any limitation to embodiments of the invention, and embodiments of the invention should not be limited thereto. The function may be a single function such as a summation (SUM) function, an average (AVG) function, a maximum (MAX) function, and a top n (TOPN) function. The function may be a nested function such as an AVG (TOPN) function. This is not specifically limited in embodiments of the invention. All functions may be used to calculate a needed indicator according to an indicator type.

It should be further understood that the listed indirect association relationship between the first resource and the second resource is merely used as an example for description, but should not constitute any limitation to embodiments of the invention. For resources having the direct association relationship, the second resource associated with the first resource may be determined by using the association relationship tree information, and the first indicator may be determined according to the second indicator of the second resource. All methods of determining, according to association relationship tree information, a second resource associated with a first resource, and determining a first indicator of the first resource according to the second resource shall fall within the protection scope of embodiments of the invention.

Therefore, according to the method for determining a resource indicator in at least one embodiment of the invention, a second resource associated with a first resource is determined according to association relationship tree information, and an indicator of the first resource is determined according to the second resource, thereby rapidly and accurately determining a network performance indicator of the first resource, reducing calculation workload of an intermediate-layer resource, and reducing a waste of space.

It should be understood that the method for determining a resource indicator according to at least one embodiment of the invention being used to determine a network performance indicator is merely used as an example for description, but should not constitute any limitation to embodiments of the invention, and embodiments of the invention are not limited thereto. Embodiments of the invention are applicable to determining of indicators of resources in various scenarios in which a layering structure is provided and in which resources are mutually associated.

Optionally, S210 of obtaining, by a server, association relationship tree information includes:

obtaining, by the server, a preset association relationship tree model, where the association relationship tree model is used to indicate association relationships between resource types of the multiple resources;

determining, by the server, the multiple resources corresponding to the resource types of the multiple resources; and determining, by the server, the association relationship tree information according to the multiple resources.

Specifically, the server may save an association relationship tree model in advance, that is, predefine an association relationship tree model according to mutually associated resource types. The model indicates association relationships between multiple resource types. In other words, the association relationship tree model may be understood as a definition of a static model. For different service scenarios, a resource corresponding to each resource type is variable. The server may define, according to conditions of resources that change in real time and according to a service scenario, association relationship tree information of a resource corresponding to a current service scenario. In other words, the association relationship tree information may be understood as a definition of a dynamic model. The association relationship tree information may change in real time as a service scenario changes or a resource changes.

It should be noted that the association relationship tree model may not have a one-to-one correspondence with the association relationship tree information. That is, one association relationship tree model may correspond to at least one piece of association relationship tree information. Alternatively, one association relationship tree model may be applied to multiple service scenarios and used to generate multiple pieces of association relationship tree information and indicate association relationships between different resources in different scenarios, so that a network performance indicator of a resource can be accurately determined and an actual condition of a current network can be reflected.

Optionally, S220 of determining, by the server according to the association relationship tree information, a second resource indirectly associated with a first resource includes:

determining, by the server according to the association relationship tree information, a third resource having the direct association relationship with the first resource, where the third resource is located at at least one resource layer between a resource layer at which the first resource is located and a resource layer at which the second resource is located; and determining, by the server, the second resource according to the third resource.

Specifically, when the association relationship between the first resource and the second resource is the indirect association relationship, determining of the first indicator needs to depend on the third resource. That is, although the second resource indirectly associated with the first resource can be found by using the association relationship tree information, the second indicator of the second resource cannot be directly reported to the first resource, and can only be reported to the first resource by means of forwarding by the third resource, so that the first indicator is determined.

In at least one embodiment of the invention, forwarding of the third resource may be understood as transparent transmission, that is, the second indicator reported by the second resource is directly reported to the first resource without being processed. Correspondingly, in the conventional techniques, for the first resource, the second resource indirectly associated with the first resource cannot be determined and the second indicator of the second resource cannot be directly obtained. Instead, the third resource needs to be searched for and calculated, and an indicator obtained by means of calculation of the third resource is reported to the first resource. Consequently, calculation workload of intermediate-layer resources is increased, and unnecessary calculation is added. As a result, the first indicator is not determined in an accurate and timely manner.

In at least one embodiment of the invention, no matter whether the second resource is located at a resource layer adjacent to a resource layer of the first resource or the resource layer at which the second resource is located and the resource layer at which the first resource is located are spaced by multiple resource layers, the second resource associated with the first resource can be found according to the association relationship tree information. By means of transparent transmission by using an intermediate-layer resource, the second indicator may be rapidly obtained and the first indicator may be determined.

Particularly, at least one embodiment of the invention provides an indicator formula (marked as a first indicator formula below for ease of description). The first indicator formula may include three parts of content, that is, a target function, a resource, and an indicator. The target function may be a function for determining the first indicator of the first resource. The resource may include the first resource and the second resource associated with the first resource. The indicator may include the first indicator. That is, which indicator of which resource the first indicator formula is used to determine, which function is used to determine the indicator, and how an input value (that is, the second indicator of the second resource) of the target function is obtained may be determined according to the first indicator formula.

For example, the first indicator formula is used to determine to use a summation (SUM) function to determine a "transmission speed of a PW trail". An input value is a transmission speed of each PW associated with the PW trail. According to the first indicator formula, the server uses a corresponding transmission speed collected from each PW as the target input value, and determines the first indicator by using the target function.

It should be noted that each PW associated with the PW trail may be a PW having a direct reference relationship with the PW trail, or may be a PW having an indirect reference relationship with the PW trail, or may be a group member of the PW trail. This is not specifically limited in embodiments of the invention.

It should be further noted that the target input value may be a value, or a value list. This is not specifically limited in embodiments of the invention.

The server may determine, according to a current service scenario, the first indicator formula for calculating the first indicator of the first resource. In different service scenarios, a same indicator is affected by different factors. For example, for a port bandwidth, different units are used in different fields. Therefore, the server needs to determine, according to the current service scenario, the first indicator formula which can accurately reflect the indicator.

For example, a maximum transmission value of a layer 2 link needs to be calculated. In a radio access network (RAN) and a packet transport network (RTN), service scenarios of layer 2 links are different, and associated second resources are also different. Therefore, different indicator formulas may be defined according to the different service scenarios. The indicator formulas are respectively used to determine maximum traffic of the layer 2 link in the RAN and maximum traffic of the layer 2 link in the PTN.

A first indicator formula for determining maximum traffic of layer 2 links in different service scenarios is listed below:

```
IP RAN L2Link:Traffic OUT MAX
Max
(
    {R2080'IPInterface'}[{R2020:'L2Link'}.
    {P1021:'aInterfaceID'}].{I10009:'Traffic Out
Max'}
    {R2080'IPInterface'}[{R2020:'L2Link'}.
    {P1022:'zInterfaceID'}].{I10009:'Traffic Out
Max'}
)
PTN L2Link:Traffic OUT MAX
Max
(
```

-continued

```
    {R2080'ETHPort'}[{R2020:'L2Link'}.
    {P1021:'aInterfaceID'}].{I10010:'Traffic Out
Max'}
    {R2080'ETHPort'}[{R2020:'L2Link'}.
    {P1021:'zInterfaceID'}].{I10010:'Traffic Out
Max'}
)
```

IP RAN L2Link:Traffic OUT MAX is used to determine maximum traffic of a layer 2 link in an Internet-Protocol (IP)-based RAN. The first indicator formula defines that maximum traffic of each inbound interface (aInterface) and outbound interface (zInterface) of the layer 2 link needs to be determined in the scenario. Similarly, PTN L2Link: Traffic OUT MAX is used to determine maximum traffic of the layer 2 link in the PTN. The first indicator formula defines that maximum traffic of ports of the layer 2 link needs to be determined in the scenario, where the maximum traffic is specifically maximum traffic of each aInterface and zInterface. In addition, each aInterface or zInterface corresponds to a unique identifier (ID). Therefore, the unique identifier is indicated by a property name corresponding to an ID number of the second resource (that is, the aInterface and the zInterface) in the first indicator formula. When parsing the first indicator formula, the server searches for a corresponding interface according to the ID number of the interface corresponding to the property name of the second resource, so as to obtain a corresponding second indicator (that is, traffic of the interface). It should be noted that each resource has multiple properties, including a property for indicating an associated resource of the resource. By means of a property name of the property, an ID of the associated resource of the resource may be determined. For example, the property name is the same as an ID of the resource, and the associated resource is then determined.

Optionally, S230 of determining, by the server, the indicator of the first resource according to the second resource includes:

determining, by the server, the indicator of the first resource according to the second resource by using a target function.

Specifically, it may be seen from the first indicator formula listed above that a target function (for example, a maximum (MAX) function) for determining the first indicator is included. The first indicator formula may indicate a summation (SUM) function, an average (AVG) function, a minimum (MIN) function, a top N (TOPN) function, and the like. The first indicator formula may indicate a nested function such as AVG(TOPN). That is, after the first indicator formula is determined, the target function for determining the first indicator is determined. The target function may be a single function, or may be a nested function. This is not specifically limited in embodiments of the invention.

An example of the target function is listed below.

```
<bean id="TOPN"
    class="com.utraffic.srv.calculation.calculator.sdk.functionbean.SupportedFunctionDeta
ils">
    <Property name="name"
        Value="com.utraffic.srv.calculation.calculator.method.list.TopnMethod"/>
    <Property name="supportedArgs" value="1"/>
    <Property name="functionType" value="4"/>
</bean>
```

It can be seen that the target function starts with <bean and ends with </bean>. In the target function, the function is defined to be a TOPN function. A value of a target input value (supportedArgs) supported by the function is "1", representing that the TOPN function supports inputting of a value or a value list.

It should be understood that the code of the function listed above is merely used as an example for description, but should not constitute any limitation to embodiments of the invention, and embodiments of the invention should not be limited thereto. There may be multiple types of target functions, and the target function may be used separately or may be used in a nested manner. A specific function that needs to be used may be determined according to a definition of the first indicator formula. This is not specifically limited in embodiments of the invention.

It should be noted that when multiple target functions are used in a nested manner, each target function needs to be calculated step by step according to a nesting relationship of the functions, and each target function may be distinguished from other target functions and used in a form of bean.

In at least one embodiment of the invention, the target function is saved in an Extensible Markup Language (XML) file. The XML file may be used to save all functions supported by the frame. When the server determines, according to the first indicator formula, a target function that needs to be invoked, the server may directly invoke the target function from the XML file. In addition, the XML file has a feature of extensibility. When function types saved in the XML file cannot satisfy operation requirements, a new function may be added to the XML file.

It should be understood that the XML file is an example of a form of saving the target function, but should not constitute any limitation to embodiments of the invention, and embodiments of the invention should not be limited thereto. Other extensible document files that are used to save the target function shall fall within the protection scope of embodiments of the invention.

It should be further understood that the target function is fixed and universal, and may be understood as a frame. The first indicator formula changes according to different service scenarios, and may be understood as corresponding calculation models created according to the different service scenarios. The target input value changes as the first indicator formula changes. After determining a calculation model, the server may input the calculation model to the frame, and calculates a needed performance indicator by using the frame.

Therefore, according to the method for determining a resource indicator in at least one embodiment of the invention, a second resource associated with a first resource is determined according to association relationship tree information, and an indicator of the first resource is determined according to the second resource, thereby rapidly and accurately determining a network performance indicator of the first resource, reducing calculation workload of an intermediate-layer resource, and reducing a waste of space. In addition, different indicator formulas are defined according to different service scenarios, and real-time and accurate input values are obtained according to real-time changes of resources, thereby improving accuracy of indicators. Target functions are saved in an extensible file, so that a client can extend the functions according to requirements, thereby achieving flexibility and convenience and higher usability.

A process of determining, by a server according to association relationship tree information, a resource associated with a first resource is described in detail below with reference to FIG. 6 to FIG. 8.

In at least one embodiment of the invention, the server may determine a second resource according to a first indicator formula and by considering association relationships that are between resources and that are indicated by the association relationship tree information. Specifically, the server determines, according to the first indicator formula, a third resource having a direct association relationship with the first resource, and determines, according to the third resource, a second indicator having a direct association relationship with the third resource. In other words, the server searches layer by layer, according to the first indicator formula, for a lower-layer resource having a direct association relationship with an upper-layer resource. The process may be repeated until a second resource at a bottom layer is found.

Examples in which the third resource at an adjacent layer is determined by using the first resource and the second resource at a non-adjacent layer is determined by using the first resource are described in detail herein. There may be multiple manners of indicating the third resource in the first indicator formula. For example, the first resource determines a lower-layer resource of the first resource, but the third resource does not determine a condition of an upper-layer resource of the third resource, that is, the first resource has reference to the third resource (case 1). For another example, the first resource does not determine a condition of a lower-layer resource (or, the third resource) of the first resource, but the third resource determines a condition of an upper-layer resource (or, the first resource) of the third resource, that is, the third resource has reference to the first resource (case 2). For still another example, the first resource determines a condition of a lower-layer resource of a lower-layer resource of the first resource, that is, the first resource makes inter-layer reference to the second resource (case 3).

Case 1

Optionally, the determining, by the server according to the association relationship tree information, a third resource directly associated with the first resource includes:

determining, by the server, the third resource according to an identifier ID of the first resource and the association relationship tree information, where a property name indicated by a property of the third resource is the same as the ID of the first resource.

Figure 6:
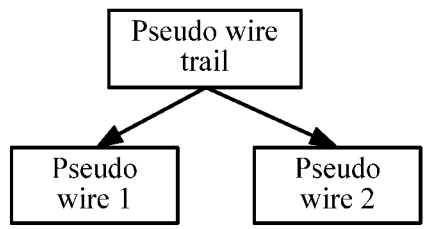
FIG. 6 is a schematic relationship diagram of a first resource having reference to a third resource according to an embodiment of the invention.

Specifically, case 1 may correspond to FIG. 6. FIG. 6 is a schematic relationship diagram of the first resource having reference to the third resource according to an embodiment of the invention. As shown in FIG. 6, a PW trail 1 has reference to a PW1 and a PW2, that is, as an upper-layer resource of the third resource (that is, the PW1 and the PW2), the first resource (that is, the PW trail 1) knows a condition of a lower-layer resource of the first resource. Therefore, when a total transmission speed (that is, an instance of a first indicator) of the PW trail 1 (that is, an instance of the first resource) is to be determined, a transmission speed (that is, an instance of a third indicator) of the PW1 (that is, an instance of the third resource) and a transmission speed (that is, another instance of the third indicator) of the PW2 (that is, another instance of the third resource) need to be determined to determine the first indicator of the first resource. An example of the first indicator formula for determining the total transmission speed of the PW trail 1 is listed below.

PWTrail.Speed=SUM({R2040::'PW'}[{R2030: 'PWTrail'}.{P201:'PWList'}].{I101:'Speed'})

SUM represents that a target function is a SUM function, R represents a resource, P represents a property, and I represents an indicator. The first indicator formula may be simply understood as SUM (resource type[which resources] what indicator). That is, {R2040:'PW'} indicates that a type of the first resource is PW, and {I101:'Speed'} indicates that the first indicator is a transmission speed. That is, the first indicator formula is used to determine a transmission speed of a PW trail. The PW trail 1 is the first resource, and [{R2030:'PWTrail'}. {P201:'PWList'}] describes in detail how to parse and search for the third resource. Because the PW trail 1 has reference to PWs, that is, the PW trail 1 knows the PWs that the PW trail 1 has, the server may search for the second resource according to a property P201 in the PW trail 1. Specifically, a list of IDs of the PWs that the PW trail 1 has is saved in a property name of the property P201. In other words, a resource indicated by the property P201 is a list of IDs of the third resource. In other words, the server determines the list of the IDs of the third resource according to a property value of the first property of the first resource, and further finds the second resource according to correspondences between the third resource and the ID. Therefore, the server collects a corresponding transmission speed (that is, an instance of the third indicator) from each PW that is used as the third resource, and determines a total transmission speed of the PW trail 1 by using the corresponding transmission speed as a target input value.

Case 2

Figure 7:
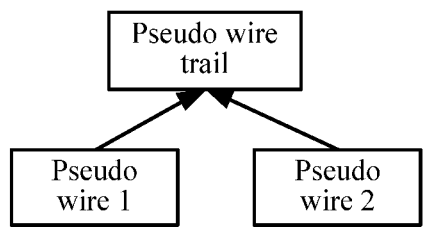
FIG. 7 is a schematic relationship diagram of a third resource having reference to a first resource according to an embodiment of the invention.

Optionally, the determining, by the server according to the association relationship tree information, a third resource directly associated with the first resource includes:

determining, by the server, a list of IDs of the third resource according to a property of the first resource, where the list of the IDs of the third resource is saved in the property of the first resource; and determining, by the server, the third resource according to the list of the IDs of the third resource and the association relationship tree information, where the third resource has a one-to-one correspondence with the ID of the third resource.

case 2 may correspond to FIG. 7. FIG. 7 is a schematic relationship diagram of the third resource having reference to the first resource according to an embodiment of the invention. As shown in FIG. 7, a PW1 and a PW2 have reference to a PW trail 1. That is, the first resource (that is, the PW trail 1) is used as an upper-layer resource of the third resource (that is, the PW1 and the PW2) but does not know a condition of a lower-layer resource of the first resource. However, a resource pointed by a property of the lower-layer resource of the PW trail 1 is reserved in the lower-layer resource (including the PW1 and the PW2) of the PW trail 1. Therefore, when a total transmission speed (that is, an instance of a first indicator) of the PW trail 1 (that is, an instance of the first resource) is to be determined, because the PW trail 1 does not know a condition of the lower-layer resource of the PW trail 1, the PW trail 1 traverses all PWs at a lower layer of the PW trail 1, finds a PW of which a property points to the PW trail 1 (PW Trail 1) as the third resource, and determines the total transmission speed of the PW trail 1 according to a transmission speed (an instance of a third indicator) of the PW.

Another example of the first indicator formula for determining the total transmission speed of the PW trail 1 is listed below.

PWTrail.Speed=SUM({$R2040$:'PW'}[{$R2040$:'PW'}. {$P202$:'PWTrail'}]. {$I101$:'Speed'})

{R2040:'PW'} indicates that a type of the first resource is PW, {I101:'Speed'} indicates that the first indicator is a transmission speed, and [{R2040:'PW'}. {P202: 'PWTrail'}] describes in detail how to parse and search for the third resource. The PW trail 1 does not know a condition of a lower-layer resource of the PW trail 1, or the PW trail 1 does not know which PWs that the PW trail 1 has. A property of an ID for indicating a resource to which each PW belongs is reserved in each PW, and the property may be a property P202. Therefore, the server traverses all PWs. When a property name of a property P202 of a PW is the same as an ID of the PW trail 1, it is considered that the property P202 of the PW indicates the PW trail 1, or the PW of which the property name of the property P202 is the PW trail 1 may be determined as the third resource. In other words, the server determines, according to the ID of the first resource, a resource of which a property name is the same as the ID of the first resource as the third resource. The server collects a corresponding transmission speed (that is, an instance of the third indicator) from each PW that is used as the third resource, and determines a total transmission speed of the PW trail 1 by using the corresponding transmission speed as a target input value.

Figure 8:
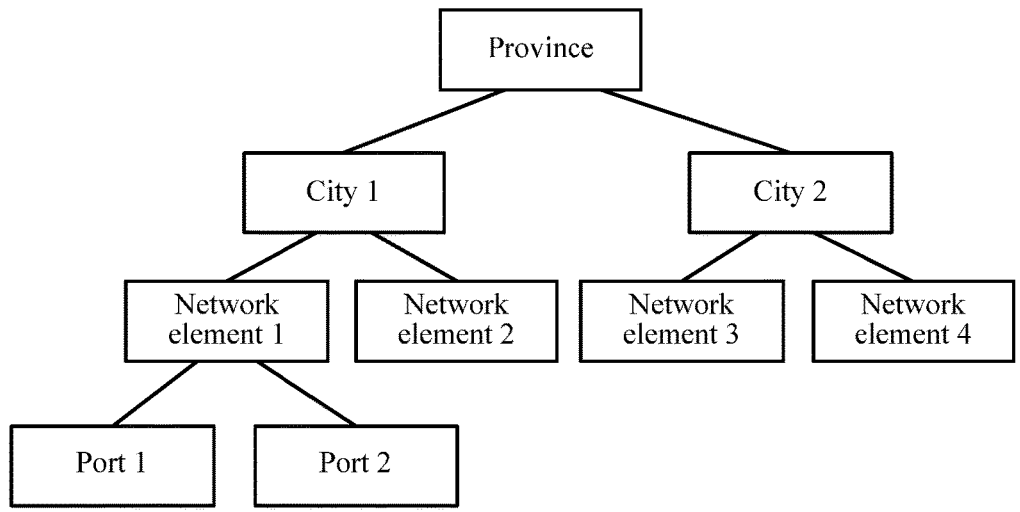
FIG. 8 is a schematic diagram of a first resource making inter-layer reference to a second resource according to an embodiment of the invention.

Case 3 case 3 may correspond to FIG. 8. FIG. 8 is a schematic diagram of the first resource making inter-layer reference to the second resource according to an embodiment of the invention. As shown in FIG. 8, a transmission bandwidth indicator of a province depends on NEs in cities, or even ports of the NEs. Therefore, when a transmission bandwidth (that is, an instance of the first indicator) of a province (that is, an instance of the first resource) is to be determined, transmission bandwidths (that is, an instance of the second indicator) of NEs (that is, an instance of the second resource) at a lower layer of a lower layer of the province and transmission bandwidths (that is, another instance of the second indicator) of ports (that is, another instance of the second resource) at a lower layer of the NEs need to be determined.

An example of the first indicator formula for determining average transmission speeds of all ports in a province is listed below.

ProvinceSpeedAvg=AVG({$R2080$:'Port'[{$R1020$:'City'}. {P1100:'Province'}&{$R1010$:' NE'}.{P1019:'City'}&{$R2080$:'Port'}.{P1024:'NE'}]. {I101:'speed'})

AVG represents that a target function is an AVG function, the first indicator formula may be used to indicate an average transmission speed ({I101:'speed'}) of a determined port ({R2080:'Port'}), and [{R1020:'City'}. {P1100: 'Province'}&{R1010:'NE'}. {P1019:'City'}& {R2080: 'Port'}. {P1024:'NE'}] describes in detail how to parse and search for the second resource. It is assumed that {R1020: 'City'}. {P1100:'Province'} is X, {R1010:'NE'}. {P1019: 'City'} is Y, and {R2080:'Port'}. {P1024:'NE'} is Z, [{R1020:'City'}. {P1100:'Province'}&{R1010:'NE'}. {P1019:'City'}&{R2080:'Port'}. {P1024:'NE'}] may be simply seen as [X&Y&Z]. That is, resources are expanded layer by layer by means of the three layers X, Y, and Z. Each letter represents a logic by which the layer is expanded. X represents to list a city of which a current property name is the same as an ID of a province 1 by using a province property of the city. Y represents to list an NE of which a current property name is the same as IDs of a city 1 and a city 2 by using a city property of the NE. Z represents to list a port of which a current property name is the same as an ID of an NE1 by using an NE property of the port. That is, by means of a correspondence of a property of a resource at each layer, a port may be directly found from the province, and calculation does not need to be performed among cities and NEs, thereby reducing calculation workload and development workload, avoiding generation of an unnecessary intermediate indicator, saving a space resource, and improving calculation efficiency.

It should be noted that the method for searching for a resource in case 3 is performed based on that a lower-layer resource has reference to an upper-layer resource. When the upper-layer resource has reference to the lower-layer resource, searching may be performed by using a method similar to the method in case 1. For brevity, details are not described herein again.

It should be further noted that the methods for searching for the third resource listed in case 1 and case 2 may be applied to a process in which each resource is used to search for an adjacent lower-layer resource in case 3. In other words, the process for searching for the third resource listed in case 1 and case 2 may be repeated until the server determines a second resource at a bottom layer.

It should be understood that the foregoing listed methods for determining the second resource by using the first indicator formula are merely used as examples for description, but should not constitute any limitation to embodiments of the invention. A specific method for determining the second resource by using the first indicator formula is not specifically limited in embodiments of the invention.

It should be further understood that the properties P201 and P202 listed above are merely used as examples for description, but should not constitute any limitation to embodiments of the invention, and embodiments of the invention should not be limited thereto. Each resource is not limited to having only one type of property, and each property of each resource is used to indicate different content. It should be understood that the property described herein is a property for indicating a correspondence between resources of layers, so that an associated resource is found according to the correspondence. The property is only a specific implementation, and other manners for indicating correspondences between resources shall fall within the protection scope of embodiments of the invention.

It should be further understood that the resources R2040 and R2030 listed above are merely used as examples for description, but should not constitute any limitation to embodiments of the invention, and embodiments of the invention should not be limited thereto. Each resource corresponds to a unique ID, and the ID is used to identify the resource. When parsing the first indicator formula and reading a corresponding ID, the server can determine a corresponding resource. A method for identifying a resource by using a resource ID is merely used as an example for description, and other methods or forms for identifying a resource shall fall within the protection scope of embodiments of the invention.

Therefore, according to the method for determining a resource indicator in at least one embodiment of the invention, a second resource associated with a first resource is determined according to association relationship tree information, and an indicator of the first resource is determined according to the second resource, thereby rapidly and accurately determining a network performance indicator of the first resource, reducing calculation workload of an intermediate-layer resource, and reducing a waste of space.

Optionally, the target input value is a value or a value list. The value list is a list of second indicators of multiple second resources at a same time point, or a list of second indicators of one second resource at multiple time points.

Specifically, the function may include a list function and a scalar function. The list function may support multiple-input and single-output or multiple-input and multiple-output. The scalar function may support single-input and single-output. That is, the target input value may be a single value, or may be a value list. A specific condition of the first indicator is determined according to requirements. The value list may be a list of second indicators of multiple second resources at a same time point, or may be a list of second indicators of a second resource at multiple time points. In other words, the calculation frame supports calculation of a horizontal dimension of a resource object and a vertical dimension of time.

Optionally, a target function includes a first target function and a second target function, and the determining, by the server, the indicator of the first resource according to the second resource by using a target function includes:

determining, by the server, a target output value according to a target input value by using the first target function, where the target input value is a first value list, the target output value is a first value, and the first value list is a list of second indicators of multiple second resources at a same time point or a list of second indicators of one second resource at multiple time points; and determining, by the server, a first indicator according to the first value by using the second target function.

In at least one embodiment of the invention, for ease of performing the function, according to input and output types, the target function may be classified into the first target function and the second target function. The first target function may be understood as an intermediate step for determining the first indicator, an input value of the first target function may be a value list, an output value may be a value, and a target output value is an input value of the second target function. The second target function may be understood as a final step for determining the first indicator. The second target function determines the output value (that is, the first indicator) according to an input target input value. The output value may be a value.

It should be noted that the first target function may be a single function, or may be a nested function. A function is classified as the first target function as long as the function satisfies a feature in which a list is input and a value is output. The second target function may be a function, or a single value output by the first target function may also be directly output as an output value of the second target function. A function is classified as the second target function as long as the function satisfies a feature in which a value is input and a value is output.

Optionally, the first target function includes a first target sub-function and a second target sub-function, and the determining, by the server, a target output value according to a target input value by using the first target function, where the target input value is a first value list, and the target output value is a first value includes:

determining, by the server, a second value list according to the first value list by using the first target sub-function; and determining, by the server, the first value according to the second value list by using the second target sub-function.

Specifically, when the first target function is a nested function, the first target function may be further classified into the first target sub-function and the second target sub-function according to an input and output type of the function. Both an input value and an output value of the first target sub-function may be a value list. For example, the input value is the first value list, and the output value is the second value list. However, an input value of the second target sub-function is a list, and an output value of the second target sub-function is a value. For example, the input value is a second input list, and the output value is the first value.

It should be noted that the first target sub-function may be a single function or a nested function. A function is classified as the first target sub-function as long as the function satisfies a feature in which a list is input and a list is output. The second target sub-function may be understood as a function between the first target sub-function and the second target function and is used to convert, by means of calculation, a list (that is, the second value list) output by the first target sub-function into a value (that is, the first value) and output the value to the second target function.

Description is provided below by using AVG(TOPN) as an example.

TOPN is a multiple-input multiple-output function and may be classified as the first target sub-function. However, AVG is a multiple-input single-output function, and may be classified as the second target sub-function. Therefore, AVG (TOPN) is a first target function and an output value of AVG(TOPN) is a single value. Therefore, the second target function may directly use the value, that is, the second target function may directly use the output value of the first target function as an output value of the second target function, that is, as the first indicator.

It should be understood that the first value, the first value list, the second value list, the first target function (including the first target sub-function and the second target sub-function), and the second target function are merely used as examples for description for ease of distinguishing and understanding, but should not constitute any limitation to embodiments of the invention. First and second do not mean a sequence of operations or a sequence of input and output values. A sequence of performing functions is determined according to a dependence relationship that is between the first resource and the second resource and that is obtained by parsing the first indicator formula.

Therefore, according to the method for determining a resource indicator in at least one embodiment of the invention, a second resource associated with a first resource is determined according to association relationship tree information, and an indicator of the first resource is determined according to the second resource, thereby rapidly and accurately determining a network performance indicator of the first resource, reducing calculation workload of an intermediate-layer resource, and reducing a waste of space. Moreover, target functions are performed in a classified manner, thereby achieving flexibility and convenience and facilitating implementation.

The method 200 for determining a resource indicator according to the embodiments of the invention is described in detail above with reference to FIG. 5 to FIG. 8. A specific process of parsing a first indicator formula by a server according to an embodiment of the invention is described in detail below with reference to FIG. 9.

Figure 9:
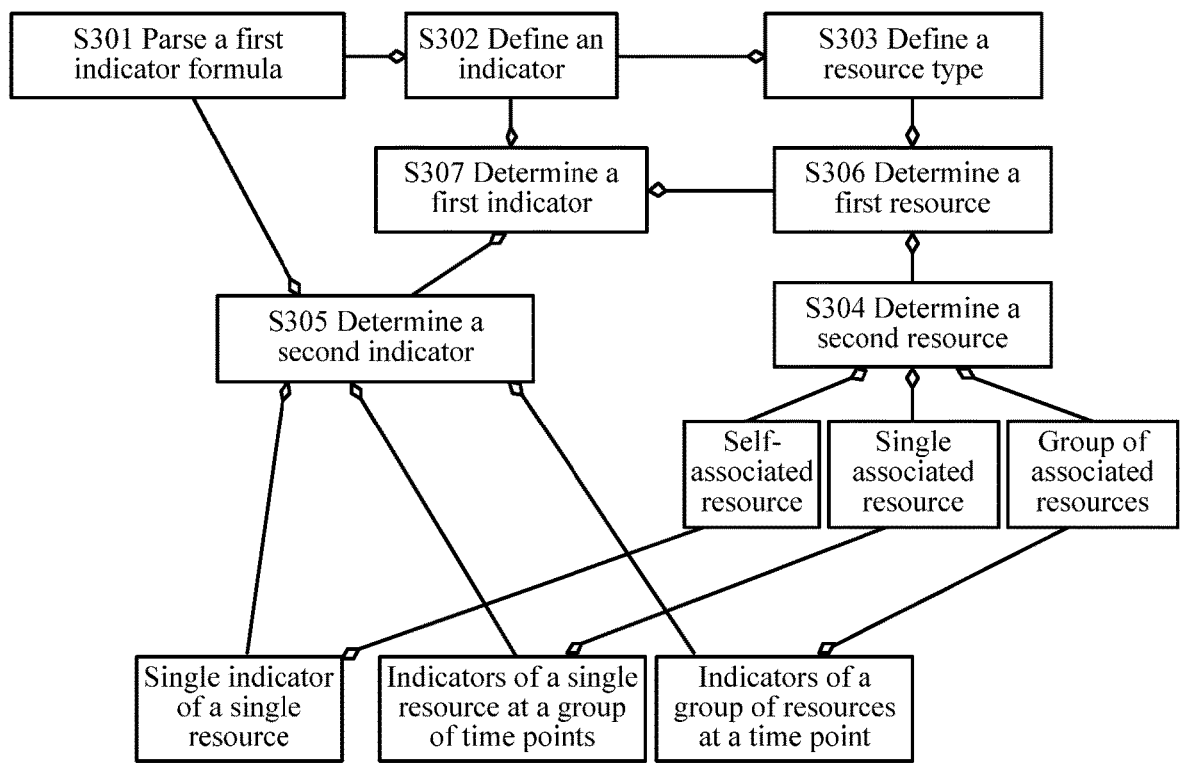
FIG. 9 is a schematic flowchart of parsing a first indicator formula by a server according to an embodiment of the invention.

FIG. 9 is a schematic flowchart of parsing a first indicator formula by a server according to an embodiment of the invention.

S301: A server parses a first indicator formula and determines what indicator (for example, a first indicator) of what resource (for example, a first resource) the first indicator formula is used to determine; or more specifically, the server first performs, according to the first indicator formula, operation S302 of defining a first indicator, and further performs operation S303 of defining a resource type of a first resource to which the first indicator belongs. This may be a static definition. By means of the first indicator formula, an indicator that the calculation frame needs to calculate is determined.

S304: The server determines, according to the first indicator formula, a second resource associated with a first resource, where the second resource may be the first resource, that is, a self-associated resource, or may be a single associated resource or a group of associated resources.

S305: The server parses, according to the first indicator formula, an indicator that depends on the first indicator and that is determined by the first indicator formula, that is, a dependent indicator (or, a second indicator). In other words, the server may determine, according to the first indicator formula, that the first indicator of the first resource depends on the second indicator of the second resource. The second indicator has different forms of expression in multiple service scenarios. For example, the second indicator may be a single indicator of a single resource, or indicators of a single resource at a group of time points, or indicators of a group of resources at a time point. That is, the second indicator may be a value or a value list. The second indicators in different forms may be determined according to different service scenarios. A correspondence between the second indicator and the second resource may be shown in FIG. 9. It should be noted that for a self-associated resource, the server uses an indicator output by the first resource as the second indicator.

S306: The server eventually determines the first resource according to the second resource. Determining in this case may be understood as dynamic determining, and the first resource may change as the second resource changes.

S307: The server eventually determines the first indicator according to the second indicator and the second resource. Determining in this case may be understood as dynamic determining, and the first indicator may change as the second indicator and the first resource change.

It should be understood that sequence numbers of the foregoing processes do not mean a sequence of performing the processes. The sequence of performing the processes should be determined according to functions and internal logic of the processes, and should not be construed as any limitation on the implementation processes of the embodiments of the invention.

Therefore, according to the method for determining a resource indicator in at least one embodiment of the invention, a second resource associated with a first resource is determined according to association relationship tree information, and an indicator of the first resource is determined according to the second resource, thereby rapidly and accurately determining a network performance indicator of the first resource, reducing calculation workload of an intermediate-layer resource, and reducing a waste of space.

The methods for determining a resource indicator according to the embodiments of the invention with reference to FIG. 5 to FIG. 9 are described in detail above, and an apparatus 400 for determining a resource indicator according to an embodiment of the invention is described in detail below with reference to FIG. 10.

Figure 10:
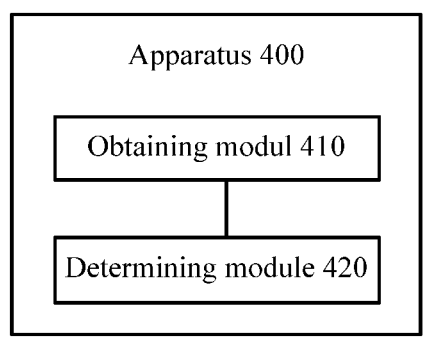
FIG. 10 is a schematic block diagram of an apparatus for determining a resource indicator according to an embodiment of the invention.

FIG. 10 is a schematic block diagram of the apparatus 400 for determining a resource indicator according to an embodiment of the invention. As shown in FIG. 10, the apparatus 400 includes an obtaining module 410 and a determining module 420.

The obtaining module 410 is configured to obtain association relationship tree information, where the association relationship tree information is used to indicate association relationships between multiple resources, the multiple resources include resources located at at least three resource layers, the association relationships include a direct association relationship and an indirect association relationship, two resources having the direct association relationship are separately located at two adjacent resource layers, and two resources having the indirect association relationship are separately located at resource layers spaced by at least one resource layer.

The determining module 420 is configured to: determine, according to the association relationship tree information, a second resource having the indirect association relationship with a first resource, and determine an indicator of the first resource according to the second resource.

Optionally, the obtaining module 410 is specifically configured to obtain a preset association relationship tree model, where the association relationship tree model is used to indicate association relationships between resource types of the multiple resources.

The determining module 420 is specifically configured to: determine the multiple resources corresponding to the resource types of the multiple resources; and determine the association relationship tree information according to the multiple resources.

Optionally, the determining module 420 is specifically configured to: determine, according to the association relationship tree information, a third resource having the direct association relationship with the first resource, where the third resource is located at at least one resource layer between a resource layer at which the first resource is located and a resource layer at which the second resource is located; and determine the second resource according to the third resource.

Optionally, the determining module 420 is specifically configured to determine the third resource according to an identifier ID of the first resource and the association relationship tree information, where a property name indicated by a property of the third resource is the same as the ID of the first resource.

Optionally, the determining module 420 is specifically configured to: determine a list of IDs of the third resource according to a property of the first resource, and determine the third resource according to the list of the IDs of the third resource and the association relationship tree information, where the list of the IDs of the third resource is saved in the property of the first resource, and the third resource has a one-to-one correspondence with the ID of the third resource.

Optionally, the determining module 420 is specifically configured to determine the indicator of the first resource according to the second resource by using a target function, where the target function is saved in an Extensible Markup Language XML file.

The apparatus 400 for determining a resource indicator according to at least one embodiment of the invention may correspond to a first processing node in the management process method for determining a resource indicator according to the embodiment of the invention, and the modules of the apparatus 400 and other operations and/or functions are respectively for implementing corresponding processes in the methods in FIG. 5 to FIG. 9, and details are not described herein again for brevity.

Therefore, the apparatus for determining a resource indicator in at least one embodiment of the invention determines, according to association relationship tree information, a second resource associated with a first resource, and determines an indicator of the first resource according to the second resource, thereby rapidly and accurately determining a network performance indicator of the first resource, reducing calculation workload of an intermediate-layer resource, and reducing a waste of space.

The apparatus 400 for determining a resource indicator according to the embodiment of the invention is described in detail above with reference to FIG. 10, and a device 500 for determining a resource indicator according to an embodiment of the invention is described in detail below with reference to FIG. 11.

Figure 11:
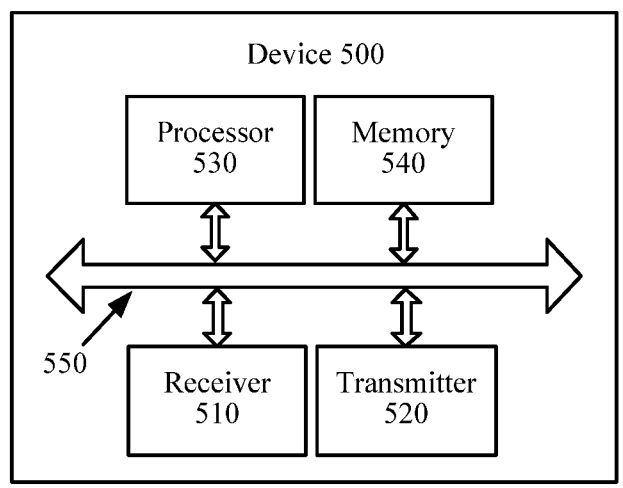
FIG. 11 is a schematic block diagram of a device for determining a resource indicator according to an embodiment of the invention.

FIG. 11 is a schematic block diagram of the device 500 for determining a resource indicator according to an embodiment of the invention. As shown in FIG. 11, the device 500 includes a receiver 510, a transmitter 520, a processor 530, a memory 540, and a bus system 550. The receiver 510, the transmitter 520, the processor 530, and the memory 540 are connected by using the bus system 550. The memory 540 is configured to store an instruction, and the processor 530 is configured to execute the instruction stored in the memory 540, so as to control the receiver 540 to receive a signal and control the transmitter 520 to send a signal.

The processor 530 is configured to obtain association relationship tree information, where the association relationship tree information is used to indicate association relationships between multiple resources, the multiple resources include resources located at at least three resource layers, the association relationships include a direct association relationship and an indirect association relationship, two resources having the direct association relationship are separately located at two adjacent resource layers, and two resources having the indirect association relationship are separately located at resource layers spaced by at least one resource layer.

The processor 530 is further configured to: determine, according to the association relationship tree information, a second resource having the indirect association relationship with a first resource, and determine an indicator of the first resource according to the second resource.

Optionally, the processor 530 is specifically configured to: obtain a preset association relationship tree model, where the association relationship tree model is used to indicate association relationships between resource types of the multiple resources; determine, according to the association relationship tree information, a third resource having the direct association relationship with the first resource, where the third resource is located at at least one resource layer between a resource layer at which the first resource is located and a resource layer at which the second resource is located; and determine the second resource according to the third resource.

Optionally, the processor 530 is specifically configured to determine the third resource according to an identifier ID of the first resource and the association relationship tree information, where a property name indicated by a property of the third resource is the same as the ID of the first resource.

Optionally, the processor 530 is specifically configured to: determine a list of IDs of the third resource according to a property of the first resource, and determine the third resource according to the list of the IDs of the third resource and the association relationship tree information, where the list of the IDs of the third resource is saved in the property of the first resource, and the third resource has a one-to-one correspondence with the ID of the third resource.

Optionally, the processor 530 is specifically configured to determine the indicator of the first resource according to the second resource by using a target function, where the target function is saved in an Extensible Markup Language XML file.

It should be understood that in at least one embodiment of the invention, the processor 530 may be a central processing unit (CPU), or the processor 530 may be another general processor, digital signal processor (DSP), application-specific integrated circuit (ASIC), field-programmable gate array (FPGA), or another programmable logic device, independent gate or transistor logic device, independent hardware component, and the like. The general purpose processor may be a microprocessor or the processor may be any conventional processor and the like.

The memory 540 may include a read-only memory and a random access memory, and provides an instruction and data to the processor 530. A part of the memory 540 may further include a non-volatile random access memory. For example, the memory 540 may further store device type information.

The bus system 550 may further include a power bus, a control bus, a status signal bus, and the like in addition to a data bus. However, for clear description, various types of buses in the figure are marked as the bus system 550.

During implementation, each operation of the foregoing method may be implemented by a hardware integrated logic circuit in the processor 530 or by an instruction in a software form. Operations of the locating methods disclosed with reference to the embodiments of the invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 540, and the processor 530 reads information in the memory 540 and completes the operations in the foregoing methods in combination with hardware of the processor. To avoid repetition, details are not described herein again.

The packet transmission device 500 according to at least one embodiment of the invention may correspond to a first processing node in the management process method according to the embodiment of the invention, and the modules of the device 500 and other operations and/or functions are respectively for implementing corresponding processes in the methods in FIG. 5 to FIG. 9, and details are not described herein again for brevity.

Therefore, the device for determining a resource indicator in at least one embodiment of the invention determines, according to association relationship tree information, a second resource associated with a first resource, and determines an indicator of the first resource according to the second resource, thereby rapidly and accurately determining a network performance indicator of the first resource, reducing calculation workload of an intermediate-layer resource, and reducing a waste of space.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean a sequence of performing the processes in various embodiments of the invention. The sequence of performing the processes should be determined according to functions and internal logic of the processes, and should not be construed as any limitation on the implementation processes of the embodiments of the invention.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of the invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In at least some embodiments, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of embodiments of the invention essentially, or the part contributing to the conventional techniques, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of the invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of embodiments of the invention, but are not intended to limit the protection scope of embodiments of the invention. Any variation or replacement readily figured out by a person skilled in the art within the technical scope disclosed in embodiments of the invention shall fall within the protection scope of embodiments of the invention. Therefore, the protection scope of embodiments of the invention shall be subject to the protection scope of the claims.

What is claimed is:

1. A method for determining a resource indicator, comprising:

obtaining, by a server, an association relationship tree information, wherein the association relationship tree information is used to indicate association relationships between multiple resources, the multiple resources comprise resources located at at least three resource layers, the association relationships comprise a direct association relationship and an indirect association relationship, two resources having the direct association relationship are separately located at two adjacent resource layers, and two resources having the indirect association relationship are separately located at resource layers spaced by at least one resource layer;

determining, by the server according to the association relationship tree information, a second resource having the indirect association relationship with a first resource, wherein the second resource is used to determine an indicator of the first resource; and determining, by the server, the indicator of the first resource according to the second resource that is spaced apart from the first resource by the at least one resource layer, wherein the indicator is a performance indicator.

2. The method according to claim 1, wherein the obtaining, by a server, association relationship tree information comprises:

obtaining, by the server, a preset association relationship tree model, wherein the association relationship tree model is used to indicate association relationships between resource types of the multiple resources;

determining, by the server, the multiple resources corresponding to the resource types of the multiple resources; and determining, by the server, the association relationship tree information according to the association relationship tree model and the multiple resources.

3. The method according to claim 1, wherein the determining, by the server according to the association relationship tree information, the second resource having the indirect association relationship with the first resource comprises:

determining, by the server according to the association relationship tree information, a third resource having the direct association relationship with the first resource, wherein the third resource is located at the at least one resource layer between a resource layer at which the first resource is located and a resource layer at which the second resource is located; and determining, by the server, the second resource according to the third resource.

4. The method according to claim 2, wherein the determining, by the server according to the association relationship tree information, the second resource having the indirect association relationship with the first resource comprises:

determining, by the server according to the association relationship tree information, a third resource having the direct association relationship with the first resource, wherein the third resource is located at the at least one resource layer between a resource layer at which the first resource is located and a resource layer at which the second resource is located; and determining, by the server, the second resource according to the third resource.

5. The method according to claim 3, wherein the determining, by the server according to the association relationship tree information, the third resource having the indirect association relationship with the first resource comprises:

determining, by the server, the third resource according to an identifier (ID) of the first resource and the association relationship tree information, wherein a property name indicated by a property of the third resource is the same as the ID of the first resource.

6. The method according to claim 3, wherein the determining, by the server according to the association relationship tree information, the third resource having the direct association relationship with the first resource comprises:

determining, by the server, a list of IDs of the third resource according to a property of the first resource, wherein the list of the IDs of the third resource is saved in the property of the first resource; and determining, by the server, the third resource according to the list of the IDs of the third resource and the association relationship tree information, wherein the third resource has a one-to-one correspondence with the ID of the third resource.

7. The method according to claim 1, wherein the determining, by the server, the indicator of the first resource according to the second resource comprises:

determining, by the server, the indicator of the first resource according to the second resource by using a target function, wherein the target function is saved in an Extensible Markup Language (XML) file.

8. The method according to claim 2, wherein the determining, by the server, the indicator of the first resource according to the second resource comprises:

determining, by the server, the indicator of the first resource according to the second resource by using a target function, wherein the target function is saved in an Extensible Markup Language (XML) file.

9. The method according to claim 3, wherein the determining, by the server, the indicator of the first resource according to the second resource comprises:

determining, by the server, the indicator of the first resource according to the second resource by using a target function, wherein the target function is saved in an Extensible Markup Language (XML) file.

10. An apparatus for determining a resource indicator, comprising:

a memory that stores an executable program code;

a communications interface; and at least one processor connected to the memory and the communications interface, wherein the executable program code instructs the at least one processor to:

obtain an association relationship tree information, wherein the association relationship tree information is used to indicate association relationships between multiple resources, the multiple resources comprise resources located at at least three resource layers, the association relationships comprise a direct association relationship and an indirect association relationship, two resources having the direct association relationship are separately located at two adjacent resource layers, and two resources having the indirect association relationship are separately located at resource layers spaced by at least one resource layer; and determine, according to the association relationship tree information, a second resource having the indirect association relationship with a first resource, and determine an indicator of the first resource according to the second resource that is spaced apart from the first resource by the at least one resource layer, wherein the indicator is a performance indicator.

11. The apparatus according to claim 10, wherein the executable program code instructs the at least one processor to: obtain a preset association relationship tree model, wherein the association relationship tree model is used to indicate association relationships between resource types of the multiple resources; and determine the multiple resources corresponding to the resource types of the multiple resources; and determine the association relationship tree information according to the association relationship tree model and the multiple resources.

12. The apparatus according to claim 10, wherein the executable program code instructs the at least one processor to: determine, according to the association relationship tree information, a third resource having the direct association relationship with the first resource, wherein the third resource is located at the at least one resource layer between a resource layer at which the first resource is located and a resource layer at which the second resource is located; and determine the second resource according to the third resource.

13. The apparatus according to claim 11, wherein the executable program code instructs the at least one processor to: determine, according to the association relationship tree information, a third resource having the direct association relationship with the first resource, wherein the third resource is located at at least one resource layer between a resource layer at which the first resource is located and a resource layer at which the second resource is located; and determine the second resource according to the third resource.

14. The apparatus according to claim 12, wherein the executable program code instructs the at least one processor to determine the third resource according to an identifier (ID) of the first resource and the association relationship tree information, wherein a property name indicated by a property of the third resource is the same as the ID of the first resource.

15. The apparatus according to claim 13, wherein the executable program code instructs the at least one processor to determine the third resource according to an identifier ID of the first resource and the association relationship tree information, wherein a property name indicated by a property of the third resource is the same as the ID of the first resource.

16. The apparatus according to claim 12, wherein the executable program code instructs the at least one processor to: determine a list of IDs of the third resource according to a property of the first resource, and determine the third resource according to the list of the IDs of the third resource and the association relationship tree information, wherein the list of the IDs of the third resource is saved in the property of the first resource, and the third resource has a one-to-one correspondence with the ID of the third resource.

17. The apparatus according to claim 13, wherein the executable program code instructs the at least one processor to: determine a list of IDs of the third resource according to a property of the first resource, and determine the third resource according to the list of the IDs of the third resource and the association relationship tree information, wherein the list of the IDs of the third resource is saved in the property of the first resource, and the third resource has a one-to-one correspondence with the ID of the third resource.

18. The apparatus according to claim 10, wherein the executable program code instructs the at least one processor to determine the indicator of the first resource according to the second resource by using a target function, wherein the target function is saved in an Extensible Markup Language (XML) file.

19. The apparatus according to claim 11, wherein the executable program code instructs the at least one processor to determine the indicator of the first resource according to the second resource by using a target function, wherein the target function is saved in an Extensible Markup Language (XML) file.

20. The apparatus according to claim 12, wherein the executable program code instructs the at least one processor to determine the indicator of the first resource according to the second resource by using a target function, wherein the target function is saved in an Extensible Markup Language (XML) file.

* * * * *